United States Patent [19]

Swanson

[11] 4,110,231

[45] Aug. 29, 1978

[54] STABILIZED AQUEOUS GELS AND USES THEREOF

[75] Inventor: Billy L. Swanson, Bartlesville, Okla.

[73] Assignee: Phillips Petroleum Company, Bartlesville, Okla.

[21] Appl. No.: 764,925

[22] Filed: Feb. 2, 1977

[51] Int. Cl.$^2$ .................... C09K 7/02; E21B 43/22; E21B 43/26
[52] U.S. Cl. ..................... 252/8.5 C; 166/275; 166/307; 166/308; 252/8.55 R; 252/8.55 D; 252/316
[58] Field of Search ............ 252/8.5 A, 8.5 C, 8.55 R, 252/8.55 D; 166/274, 275, 283, 308

[56] References Cited

U.S. PATENT DOCUMENTS

| | | | |
|---|---|---|---|
| 3,638,729 | 2/1972 | Parker | 166/273 |
| 3,667,546 | 6/1972 | Parker | 166/274 |
| 3,699,042 | 10/1972 | Browning et al. | 252/8.5 |
| 3,727,687 | 4/1973 | Clampitt et al. | 166/274 |
| 3,727,688 | 4/1973 | Clampitt | 252/8.55 X |
| 3,960,736 | 6/1976 | Free et al. | 252/8.55 |

*Primary Examiner*—Herbert B. Guynn

[57] ABSTRACT

New improved aqueous gels, and methods of using same in contacting subterranean formations, are provided. Said gels are prepared by gelling an aqueous brine having incorporated therein a water-soluble cellulose ether such as a carboxymethylcellulose (CMC), and are rendered more stable to decomposition by incorporating a lignosulfonate stabilizing agent, such as a calcium lignosulfonate, in the gel during the preparation thereof.

14 Claims, No Drawings

STABILIZED AQUEOUS GELS AND USES THEREOF

This invention relates to new stabilized aqueous gels and uses thereof.

The secondary recovery of oil from oil-bearing or containing subterranean formations by fluid drive processes wherein a fluid is injected into the formation via one or more injection wells to drive the oil through the formation to one or more production wells is a well known process. Fluids used in such processes include liquids, such as water and various hydrocarbons, and gases such as hydrocarbon gases, carbon dioxide, etc. Many oil reservoirs comprise layers or zones of porous rock which can vary in permeability from more than 1,000 millidarcys to less than 10 millidarcys. In all fluid drive processes a recognized problem is the predilection of the drive fluid to channel along or through the more permeable zones of the formation. This is commonly referred to as fingering. The more conductive zones, after the oil has been largely displaced therefrom, function as "thief zones" which permit the drive field to channel directly from injection to production wells. In many instances such channeling or fingering results in leaving substantial quantities of oil in the less permeable zones of the formation which are bypassed. Such channeling or fingering can occur when the mobility, i.e., the quotient of the reservoir's permeability to the drive fluid divided by the viscosity of the drive fluid, becomes large relative to the mobility of the reservoir oil.

Drilling fluids used in the drilling of oil wells, gas wells, and similar boreholes are commonly aqueous liquids containing clays or other colloidal materials. The drilling fluid serves as a lubricant for the bit and drill stem, as a carrying medium for the cuttings produced by the drill bit, and assists in the formation of a filter cake on the wall of the borehole for the reduction of fluid losses to the surrounding subsurface strata. It is known that excessive viscosity in the drilling fluid has an adverse effect on the penetration rate obtained by the drill bit. In many instances, substantially better rates can be secured by eliminating colloidal materials and reducing the viscosity of the drilling fluid. In some instances, air, clear water, or another similar fluid of low viscosity can be used in the place of the ordinary drilling fluid or mud.

The inventions disclosed and claimed in U.S. Pat. Nos. 3,727,687 and 3,900,406 provide a meritorious solution to the above-described problems. Said patents disclose and claim a class of aqueous gels which can comprise at least a portion of the aqueous medium used in said secondary recovery operations, the aqueous medium used in said well drilling operations, and the aqueous medium used in other oil field operations wherein a subterranean formation is contacted with an aqueous medium. According to said patents, water-soluble cellulose ethers when used in combination with a water-soluble compound of a polyvalent metal which can be reduced to a lower polyvalent valence state and a suitable reducing agent capable of reducing said polyvalent metal to said lower polyvalent valence state can be used as gelling agents to gel aqueous mediums comprising water. By varying the composition and/or amounts of said gelling agents, and/or the conditions under which they are used in forming the gels, a wide range of aqueous gels ranging from liquid highly mobile gels to rigid gels can be produced.

Stable gels can be prepared in accordance with said U.S. Pat. Nos. 3,727,687 and 3,900,406 when using brines as the starting aqueous medium. However, depending upon the brine composition and/or concentration, and the properties desired in the final gel, it is sometimes difficult to prepare gels of the desired stability with the desired certainty of success. It has now been discovered that lignosulfonates can be used as stabilizing agents for said gels. In the practice of the present invention, said lignosulfonates are incorporated into the gel during the preparation thereof to provide gels having an improved stability to decomposition, e.g., gels having an increased gel life.

Thus, the present invention is an improvement over the inventions disclosed and claimed in said U.S. Pat. Nos. 3,727,687 and 3,900,406.

According to the present invention, there is provided, in a method wherein a fluid medium is introduced into a borehole in the earth and into contact with a subterranean formation penetrated by said borehole, the improvement wherein at least a portion of said fluid medium comprises an aqueous gel, and wherein said gel comprises an aqueous brine having incorporated therein: a water-thickening amount of a water-soluble cellulose ether; a water-soluble compound of a polyvalent metal, wherein the valence state of the metal therein is capable of being reduced to a lower polyvalent valence state, in an amount which is sufficient to cause gelation of said water containing said cellulose ether when the valence of at least a portion of said metal is reduced to said lower valence state; a water-soluble reducing agent in an amount which is effective to reduce at least a portion of said metal to said lower valence state and cause said gelation with the formation of said gel; and a water-soluble lignosulfonate capable of, and in an amount sufficient for, increasing the stability of said gel to decomposition, with said amount being sufficient to provide a weight ratio of the amount of said lignosulfonate to the amount of said polyvalent metal compound which is effective to cause said lignosulfonate to be effective in increasing the stability of said gel.

Further according to the present invention, there is provided an aqueous gel, suitable for use as at least a portion of a fluid medium in a process wherein a said fluid medium is introduced into a borehole in the earth and into contact with a subterranean formation penetrated by said borehole, said gel comprising an aqueous brine having incorporated therein: a water-thickening amount of a water-soluble cellulose ether; a water-soluble compound of a polyvalent metal, wherein the valence state of the metal therein is capable of being reduced to a lower polyvalent valence state, in an amount which is sufficient to cause gelation of said water containing said cellulose ether when the valence of at least a portion of said metal is reduced to said lower valence state; a water-soluble reducing agent in an amount which is effective to reduce at least a portion of said metal to said lower valence state and cause said gelation with the formation of said gel; and a water-soluble lignosulfonate capable of, and in an amount sufficient for, increasing the stability of said gel to decomposition, with said amount being sufficient to provide a weight ratio of the amount of said lignosulfonate to the amount of said polyvalent metal compound which is effective to cause said lignosulfonate to be effective in increasing the stability of said gel.

In general, any of the water-soluble cellulose ethers can be used in the practice of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC, etc. For example, water-soluble CMC is available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in the practice of the invention can vary widely depending upon the viscosity grade and purity of the ether, and properties desired in the aqueous gels of the invention. In general, the amount of cellulose ether used will be a water-thickening amount, i.e., at least an amount which will significantly thicken the aqueous brine to which it is added. For example, amounts in the order of 25 to 100 parts per million by weight (0.0025 to 0.01 weight percent) have been found to significantly thicken water. Water containing 25 ppm of CMC has a viscosity increase of about 21 percent. At 40 ppm the viscosity increase is about 45 percent. At 100 ppm the viscosity increase is about 195 percent. Generally speaking, amounts in the range of from 0.0025 to 10, preferably from 0.01 to 5, more preferably 0.025 to 1, weight percent, based on the weight of brine, can be used. However, amounts outside said ranges can be used. In general, with the proper amounts of polyvalent metal and reducing agent, the amount of cellulose ether used will determine the consistency of the gel obtained. Small amounts of cellulose ether will usually produce liquid mobile gels which can be readily pumped whereas large amounts of cellulose ether will usually produce stiff rigid gels. If desired, said stiff gels can be "thinned" by dilution to any desired concentration of cellulose ether. This can be done by mechanical means, e.g., stirring, pumping, or by means of a suitable turbulence inducing device to cause shearing, such as a jet nozzle. Thus, there is really no fixed upper limit on the amount of cellulose ether which can be used. However, when a liquid mobile gel is desired, it is preferred to dilute the more concentrated gels before they become rigid.

Metal compounds which can be used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganate compounds the manganese is reduced from $+7$ valence to $+4$ valence as in $MnO_2$.

The amount of said metal-containing compounds used in the practice of the invention will be a sensible amount, i.e., a small but finite amount which is more than incidental impurities, but which is effective or sufficient to cause subsequent gelation when the metal in the polyvalent metal compound is reduced to a lower polyvalent valence state. The lower limit of the concentration of the starting metal-containing compound will depend upon several factors including the particular type of cellulose ether used, the concentration of the cellulose ether in the brine to be gelled, the brine which is used, and the type of gel product desired. For similar reasons, the upper limit on the concentration of the starting metal-containing compound also cannot always be precisely defined. However, it should be noted that excessive amounts of the starting metal compound, for example $+6$ chromium, which can lead to excessive amounts of $+3$ chromium when there is sufficient reducing agent present to reduce the excess $+6$ chromium, can adversely affect the stability of the gels produced. As a general guide, the amount of the starting polyvalent metal-containing compound used in preparing aqueous gels in accordance with the invention will be in the range of from 0.05 to 30, preferably 0.5 to 20, weight percent of the amount of the cellulose ether used. Stated another way, the amount of the starting polyvalent metal-containing compound used will usually be an amount sufficient to provide at least about $3 \times 10^{-3}$, preferably at least $3 \times 10^{-5}$, gram atoms of said metal capable of being reduced per gram of cellulose ether. Preferably, the amount of said metal capable of being reduced which is used will not exceed $4 \times 10^{-3}$, more preferably $2 \times 10^{-3}$, gram atoms of said metal per gram of cellulose ether. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure.

Suitable reducing agents which can be used in the practice of the invention include sulfur-containing compounds such as sodium or potassium sulfite, sodium or potassium hydrosulfite, sodium or potassium metabisulfite, sodium or potassium bisulfite, sodium or potassium sulfide, sodium or potassium thiosulfate, hydrogen sulfide, thioacetamide, and others; and nonsulfur-containing compounds such as hydroquinone, p-hydrazinobenzoic acid, hydrazine phosphite, hydrazine dichloride, and others. Some of the above reducing agents act more quickly than others, for example, the thiosulfates usually react slowly in the absence of heat, and sometimes require heating to about 125°–130° F. The presently more preferred reducing agents are the sodium or potassium hydrosulfites, or the sodium or potassium metabisulfites.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the brine, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Any suitable lignosulfonate can be used as a gel stabilizing agent in the practice of the invention. The preferred lignosulfonates are by-products of the wood pulp industry, e.g., by-products of the manufacture of paper from coniferous woods by the well known sulfite process. The woody portions of trees comprises cellulose, hemicellulose, lignins, tannins, sugars, resin acids, etc. In the manufacture of paper by the acid sulfite process, e.g., calcium acid sulfite, the wood chips are digested in the sulfite liquor. The cellulose is left as the solid phase and the hemicelluloses, lignins, etc. are dissolved by the liquid. The spent sulfite liquor is thus the source for lignosulfonates, e.g., calcium lignosulfonate and other by-products. Calcium lignosulfonate can be recovered in known manner from spent sulfite liquor by the addition of lime to the spent liquor to precipitate the lignosulfonate. The solid phase material can then be recovered by filtration and treated, as desired, by known processes to remove impurities.

The calcium of calcium lignosulfonate can be precipitated by the addition of sulfates of other cations. Thus, sodium, ammonium, aluminum, zinc, iron, chromium, magnesium, and other lignosulfonates can be formed. Sodium, calcium, and potassium lignosulfonates and others can also be formed from ammonium lignosulfonates by the use of the corresponding bases to displace ammonia.

Lignosulfonates are sometimes supplied in the form of concentrated (50 to 60 percent) aqueous solutions. The use of such liquid materials is also within the scope of the invention.

Lignins and lignosulfonates have a complex organic structure. While knowledge as to many portions of the molecule is available, the exact configuration of the molecule is not known. Lignosulfonates are apparently polymers of complex monomers. Some authorities consider each monomer as containing five benzene rings having propane side chains, one methoxy ($OCH_3$) group per monomer, one sulfonic group ($SO_3H$) per two to five monomers, and one phenolic group ($C_6H_5OH$) per five or six monomers. The monomers can be connected by an ether linkage, a furan ring linkage, and/or a pyran ring linkage. Since the structure is not known, the molecular weight is not known. However, values in the range of from 1,000 to 20,000 have been reported.

Any of the above-mentioned lignosulfonates (and others) which are capable of and effective for increasing the stability of gels prepared from solutions of cellulose ethers in brines as described herein can be used in the practice of the invention. The alkali metal, alkaline earth metal, and ammonium lignosulfonates are presently preferred for use in the practice of the invention.

Any suitable amount of lignosulfonate which is effective to increase the gel stability can be used in the practice of the invention. However, it was surprising to discover that there is apparently both a minimum and a maximum amount of lignosulfonate which should be used for best results. In other words, depending upon the other components and the amounts thereof in the gels, there is a minimum amount below which, and a maximum amount above which, said lignosulfonates are less effective in increasing the stability of the gels. It has been discovered that the amount of lignosulfonate to be used in the practice of the invention can be conveniently expressed in terms of the weight ratio of the amount of the lignosulfonate to the amount of the polyvalent metal compound used, for example, the lignosulfonate/sodium dichromate ratio. For convenience, said ratio is referred to in the examples hereinafter as the LNS/DiCr ratio. It has been found that values of said ratio within the range of from about 3.5:1 to about 8.5:1, preferably about 5:1 to about 8:1, are suitable for use in the practice of the invention for obtaining the best results. Thus, for best results in the practice of the invention, the amount of lignosulfonate used should be an amount sufficient to provide a weight ratio of the amount of said lignosulfonate to the amount of the polyvalent metal compound which is effective to cause said lignosulfonate to be effective in increasing the stability of the gel. Thus, the above-discussed ratio should be considered in the practice of the invention.

Any suitable brine can be used in the practice of the invention. As shown by the examples given hereinafter, the lignosulfonate stabilizing agents of the invention have been found to be effective in brines having a total dissolved solids (TDS) content of from about 22,000 to about 303,000 parts per million by weight. Oil field brines commonly contain varying amounts of sodium chloride, calcium chloride, magnesium chloride, etc. as well as other cations and anions. Sodium chloride is usually present in the greatest concentration. Based on the data set forth in the examples hereinafter, it has been concluded that divalent cations such as calcium, magnesium, and barium ions have an undesirable effect on the capability of the lignosulfonates for stabilizing the gels.

Thus, depending upon the TDS content of the brine being used, it is preferred that the brine not have more than about 4,000–5,000 ppm of said divalent cations.

The aqueous gels of the invention are particularly useful in operations wherein a fluid medium is introduced into a borehole in the earth, e.g., in the above-described secondary recovery operations, in the above-described well drilling operations, in well completion operations, as packer fluids, etc.

The aqueous gels of the invention can be used for treating or contacting subterranean formations in accordance with any of the techniques set forth in said U.S. Pat. No. 3,727,687. Said gels can also be used for fracturing, or fracture-acidizing of, subterranean formations in accordance with the techniques set forth in U.S. Pat. No. 3,727,688. Said gels can also be used for plugging or sealing of fractures in subterranean formations in accordance with the techniques set forth in U.S. Pat. No. 3,845,822.

The following examples will serve to further illustrate the invention, but are not to be considered as unduly limiting on the invention. In carrying out said examples, the following general procedure was employed.

The components of the gel compositions of the invention can be mixed in any suitable order. In the following examples the preferred procedure was followed. This comprised adding the lignosulfonate as a solid to a stirred solution of the cellulose ether in a brine. This was followed by the addition of a polyvalent metal compound, e.g., sodium dichromate, and a reducing agent, e.g., sodium hydrosulfite. Apparent viscosities and gel strengths were then determined after the gel had been aged for one hour at room temperature, and again after the gel had been aged about 14 hours at 120° F. Said apparent viscosities were determined by employing a Model 35 Fann Viscometer. Said gel strengths were prepared in accordance with API Procedure RP 13B, Second Edition, April 1969. In the majority of instances, the procedure followed was to prepare stock solutions containing 5,000 ppm of sodium CMC in various designated brines having different total dissolved solids (TDS) contents. Aliquot portions, e.g., 250 milliliters, of said stock solution were then used in preparing the samples used in the test runs. To said aliquots there was added, with stirring, specified amounts of the solid lignosulfonate, e.g., 1.25 grams of calcium lignosulfonate, which is equivalent to 5000 ppm per 250 milliliters of polymer solution. To the resulting solution there was then added designated amounts, e.g., 0.5 milliliter of a 100,000 ppm stock solution of $Na_2Cr_2O_7 \cdot 2H_2O$, with stirring, followed by the addition of designated amounts of a reducing agent, e.g., 0.5 milliliter of a 100,000 ppm stock solution of $Na_2S_2O_4$. The samples were then tested as indicated in the following examples.

A synthetic 90,000 ppm TDS brine was prepared by dissolving 66.6 grams of sodium chloride, 15.3 grams of calcium chloride, 5.1 grams of magnesium chloride, and 1.55 grams of barium chloride in 1 liter of deionized water. This brine was used to prepare a 22,500 ppm and a 45,000 ppm brine by dilution with deionized water. A brine of approximately 180,000 ppm TDS was prepared by dissolving 133.2 grams of sodium chloride, 30.6 grams of calcium chloride, 10.2 grams of magnesium chloride, and 3.1 grams of barium chloride in 1 liter of deionized water. This brine was then used to prepare other brines containing 135,000 ppm TDS and 157,500 ppm TDS by dilution with deionized water.

EXAMPLE I

A series of runs was carried out to illustrate the effect of calcium lignosulfonate as a gel stabilizing agent. A primary purpose of this series of runs was to illustrate the effect of the lignosulfonate/polyvalent metal ratio, e.g., herein expressed as the LNS/DiCr ratio. In this series of runs varying amounts of calcium lignosulfonate was added as a stabilizing agent during the preparation of the gels from a polymer solution containing 5,000 ppm of CMC-9 (a commercially available sodium carboxymethyl cellulose), 200 ppm of $Na_2Cr_2O_7 \cdot 2H_2O$, and 200 ppm of $Na_2S_2O_4$ in said synthetic 90,000 ppm TDS brine. The calcium lignosulfonate used was a commercially available material known as Kembreak. In these runs the concentration of the polymer, the sodium dichromate, the sodium hydrosulfite, and the brine were maintained constant; only the concentration of the lignosulfonate was varied. Gel strengths and apparent viscosities were determined as described above. Details and results from the runs are set forth in Table I below.

TABLE I

Effect of Lignosulfonate/DiCr Ratio on Gel Stability

| Run No. | Calcium Lignosulfonate ppm | Ratio LNS DiCr | Apparent Viscosity(cp) & Gels[b] After One Hour At R.T. | | | Apparent Viscosity(cp) & Gels[b] After 14 Hours AT 120° F | | | Percent Syneresis After 14 Hours at 120° F |
|---|---|---|---|---|---|---|---|---|---|
| | | | 10.2 Sec$^{-1}$ | 5.1 Sec$^{-1}$ | Gels[b] | 10.2 Sec$^{-1}$ | 5.1Sec$^{-1}$ | Gels[b] | |
| 1 | 500 | 2.5:1 | 1850 | 1500 | 19/78 | N.M.[c] | N.M.[c] | 5/13 | 28 |
| 2 | 600 | 3:1 | 1000 | 1000 | 18/58 | N.M.[c] | N.M.[c] | 0/0 | 20 |
| 3 | 800 | 4:1 | 1400 | 1300 | 21/59 | 200 | 300 | 5/15 | 4 |
| 4 | 1000 | 5:1 | 1650 | 1500 | 24/69 | 400 | 400 | 8/12 | 2 |
| 5 | 1200 | 6:1 | 1600 | 2200 | 26/42 | 300 | 300 | 6/12 | 1 |
| 6 | 1400 | 7:1 | 1550 | 2900 | 30/45 | 1000 | 1200 | 12/23 | 1 |
| 7 | 1600 | 8:1 | N.M.[c] | N.M.[c] | N.M.[c] | 800 | 1200 | 12/22 | 0 |
| 8[a] | 0 | 0 | 600 | 800 | 14/81 | 0 | 0 | 0/0 | 22 |

[a]Control Run
[b]Gel strength, lb/100 sq ft after being quiescent for 10 seconds and then 10 minutes (see API RP 13B Second Edition, April 1969)
[c]N.M. represents "not measured". DiCr = $Na_2Cr_2O_7 \cdot 2H_2O$
[e]No measurable viscosity.

Referring to the above Table I, it is evident from the data there set forth that lignosulfonates, e.g., calcium lignosulfonate, do have a stabilizing effect on gels prepared from solutions of CMC in concentrated brines when using a polyvalent metal, e.g., sodium dichromate, and a reducing agent, e.g., sodium hydrosulfite, to prepare said gels. For example, the viscosities and gel strengths after 1 hour at room temperature, and the percent syneresis and the viscosities and gel strengths after 14 hours at 120° F., show that the gels of Runs 3-7 were more stable than the gels of Runs 1, 2, and 8. Said data also show that the quantity of lignosulfonate used is an important variable. Surprisingly, it was found that a definite relationship exists between the weight ratio of the lignosulfonate, e.g., calcium lignosulfonate, to the polyvalent metal compound, e.g., sodium dichromate. For example, said data show that in Runs 1, 2, and 8 the LNS/DiCr ratio was too small. Thus, based on the data in Table I, and other data herein, it is concluded that in the practice of the invention the lignosulfonate should be used in an amount sufficient to provide a weight ratio of lignosulfonate to polyvalent metal compound which is within the range of from about 3.5:1 to about 8.5:1, preferably about 5:1 to about 8:1, for the best results.

EXAMPLE II

Another series of test runs was carried out wherein a primary purpose was to illustrate the effect of the TDS content of the brine used in the practice of the invention. Said runs were carried out in essentially the same manner and using a 5,000 ppm polymer solution, 200 ppm of sodium dichromate, and 200 ppm of sodium hydrosulfite, as in Example I. The calcium lignosulfonate was used in two concentrations for each brine concentration used. The brine concentrations were varied, i.e., from 22,500 ppm to 157,500 ppm TDS. Gel strengths and apparent viscosities were measured as in Example I. Further details and the results from said runs are set forth in Table II below.

that the brine concentration should be taken into consideration in the practice of the invention.

EXAMPLE III

Another series of runs was carried out to further investigate the effect of brine concentration in the practice of the invention. Upon consideration of the data in the above Table II, it was believed likely that the brine composition, e.g., the concentration of the divalent cations such as calcium ion, also had an effect on the stabilizing capacity of lignosulfonates in the practice of the invention. Thus, in this series of runs a field brine from West Texas was used. This brine had a TDS content of approximately 303,000 ppm. Said brine contained 185,000 ppm of chloride ion (measured), 760 ppm calcium ion (measured), 2,230 ppm of magnesium ion (calculated on a total hardness of 4500 ppm on the basis of calcium ion), and 115,000 ppm of sodium ion (by difference). Otherwise, the gel samples in said runs were prepared in essentially the same manner using a polymer solution containing 5,000 ppm of CMC-9, 200 ppm of sodium dichromate, and 200 ppm of sodium hydrosulfite, as in the above Examples I and II. Gel strengths and apparent viscosities on the resulting gels were determined as in said other examples. Further details and the results of said runs are set forth in Table III below.

TABLE II
Effect of Brine Concentration on Lignosulfonate Stabilization of Gels

| Run No. | Calcium Lignosulfonate ppm | Brine Concentration ppm | Ratio LNS DiCr | Apparent Viscosity(cp)&Gels[b] After One Hour At R.T. 10.2 Sec$^{-1}$ | 5.1 Sec$^{-1}$ | Gels | Apparent Viscosity(cp)&Gels[b] After 14 Hours At 120° F 10.2 Sec$^{-1}$ | 5.1 Sec$^{-1}$ | Gels | Percent Syneresis After 14 Hrs at 120° F |
|---|---|---|---|---|---|---|---|---|---|---|
| 10[a] | 0 | 22500 | 0 | 6450 | 10100 | N.M.[c] | 250 | 400 | N.M.[c] | 2 |
| 11 | 1000 | 22500 | 5:1 | 3350 | 5600 | N.M.[c] | 3950 | 6400 | 70/79 | Trace |
| 12 | 1600 | 22500 | 8:1 | 2400 | 4300 | N.M.[c] | 2600 | 4500 | 48/73 | Trace |
| 13[a] | 0 | 45000 | 0 | 5450 | 7600 | N.M.[c] | N.M.[c] | N.M.[c] | N.M.[c] | 6 |
| 14 | 1000 | 45000 | 5:1 | 3750 | 6200 | N.M.[c] | 3750 | 5900 | 61/60 | 1 |
| 15 | 1600 | 45000 | 8:1 | 2750 | 4300 | N.M.[c] | 2400 | 4000 | 41/64 | 1 |
| 16[a] | 0 | 90000 | 0 | 600 | 800 | 14/81 | 0 | 0 | 0/0 | 22 |
| 17 | 1000 | 90000 | 5:1 | 1650 | 1500 | 24/69 | 400 | 400 | 8/12 | 2 |
| 18 | 1600 | 90000 | 8:1 | N.M.[c] | N.M.[c] | N.M.[c] | 800 | 1200 | 12/22 | 0 |
| 19[a] | 0 | 135000 | 0 | 400 | 700 | N.M.[c] | N.M.[c] | N.M.[c] | N.M.[c] | 28 |
| 20 | 1000 | 135000 | 5:1 | 650 | 700 | N.M.[c] | N.M.[c] | N.M.[c] | N.M.[c] | 40 |
| 21 | 1600 | 135000 | 8:1 | 1200 | 1100 | N.M.[c] | N.M.[c] | N.M.[c] | N.M.[c] | 12 |
| 22[a] | 0 | 157500 | 0 | 250 | 500 | N.M.[c] | N.M.[c] | N.M.[c] | N.M.[c] | 56 |
| 23 | 1000 | 157500 | 5:1 | 250 | 300 | N.M.[c] | N.M.[c] | N.M.[c] | N.M.[c] | 12 |
| 24 | 1600 | 157500 | 8:1 | 350 | 400 | N.M.[c] | N.M.[c] | N.M.[c] | N.M.[c] | N.M.[c] |

[a]Control runs.
[b]Gel strength, lb/100 sq. ft. after being quiescent for 10 seconds and then 10 minutes: (see API RP 13B Second Edition, April 1969).
[c]N.M. represents "not measured", or "no measurable" viscosity, respectively, for the gels and viscosities.

Referring to the above Table II, it is evident from the data there set forth that the brine concentration (TDS,

TABLE III
Effect of Brine Composition on Lignosulfonate Stabilization of Gels

| Run No. | Calcium Lignosulfonate ppm | Brine Conc. TDS[c],ppm | Ratio LNS DiCr | Apparent Viscosity(cp)&Gels[b] After One Hour At R.T. 10.2 Sec$^{-1}$ | 5.1 Sec$^{-1}$ | Gels | Apparent Viscosity(cp)&Gels[b] After 14 Hours At 120° F 10.2 Sec$^{-1}$ | 5.1 Sec$^{-1}$ | Gels | Vol. % Syneresis After 14 Hours at 120° F |
|---|---|---|---|---|---|---|---|---|---|---|
| 25[a] | 0 | 303,000 | 0 | 1050 | 1200 | 21/41 | 450 | 800 | 10/22 | 3 |
| 26 | 1000 | 303,000 | 5:1 | 1050 | 1800 | 22/67 | 800 | 1000 | 10/17 | Trace |
| 27 | 1600 | 303,000 | 8:1 | 250 | 400 | 6/23 | 150 | 200 | 1/4 | 0 |

[a]Control run.
[b]Gel strength, lb./100 sq. ft. (after being quiescent for 10 seconds and then 10 minutes: see API Procedure RP 13B, Second Edition, April 1969).
[c]Approximate: 760 ppm Ca$^{++}$, 185,000 ppm Cl$^-$, 2,230 ppm Mg$^{++}$, and 115,000 ppm Na$^+$.

ppm) has an effect on the stability of gels stabilized with a lignosulfonate, e.g., calcium lignosulfonate. For example, comparing runs 11 and 12, 14 and 15, 17 and 18, 20 and 21, and 23 and 24 with their respective control runs 10, 13, 16, 19, and 22 wherein no lignosulfonate was used, it will be noted that the lignosulfonate was less effective as a stabilizing agent as the concentration of the brine increased. This was particularly true at brine concentrations of 135,000 TDS content and greater. Thus, based on the data in said Table II it is concluded Referring to the above Table III, and comparing the data therein set forth with the data set forth in the above Table II, it is evident that the brine composition also has an effect on the stability of gels stabilized with a lignosulfonate, e.g., calcium lignosulfonate. For example, comparing Runs 25, 26, and 27 with Runs 19–24 of Table II, it will be noted that the lignosulfonate was significantly more effective as a stabilizing agent in said Runs 26 and 27 than in said Runs 20 and 21 and 23 and 24 of Table II, even though the brine used in said Runs 26 and 27 had a TDS content of approximately 303,000 compared to a TDS content of about 135,000 and 157,500 for the brine used in said Runs of Table II. Thus, based on the data set forth in said Tables II and III, it is concluded that the brine composition should also be taken into consideration in the practice of the invention.

EXAMPLE IV

A series of runs was carried out to further investigate the effect of temperature on the stability of gelled solutions of cellulose ethers stabilized with a lignosulfonate, e.g., calcium lignosulfonate. In said runs the gel samples were prepared in essentially the same manner as discussed in the above examples, using a starting polymer solution containing 10,000 ppm of CMC-9 and adding thereto 400 ppm of sodium dichromate and 400 ppm of sodium hydrosulfite. The brine used was the above-described 22,500 ppm TDS brine. Each of the gel samples was then heated to 200° F in a Fann Model 50C viscometer and the apparent viscosity was measured during and after said heating. Further details and the results of said runs are set forth in Table IV below.

TABLE IV

Effect of Temperature on Lignosulfonate Stabilized Gels

| Run No. | Calcium Lignosulfonate ppm | DiCr | $Na_2S_2O_4$ | Ratio LNS/DiCr | MAXIMUM APPARENT VISCOSITIES (cp) | | | |
|---|---|---|---|---|---|---|---|---|
| | | | | | During Heating to 200° F | After Reaching 200° F | After Holding at 200° F for 1 Hour | After Cooling to Ambient Temp. |
| 28 | 1000 | 400 | 400 | 2.5:1 | 262[b] | 72 | 72 | 390 |
| 29 | 2000 | 400 | 400 | 5:1 | 255[c] | 130 | 100 | 320 |
| 30[a] | 0 | 400 | 400 | 0 | 315[d] | 17 | 12 | 123 |

[a]Control run.
[b]This reading was taken at 128° F.
[c]This reading was taken at 140° F.
[d]This reading was taken at 82° F.

Referring to the above Table IV, it is evident that the unstabilized gel of Run 30 underwent a greater percentage decrease in maximum apparent viscosity during the heat treatment and subsequent return to ambient temperature than did the stabilized gel of invention Run 29. It is also evident that the gel of Run 28, wherein the LNS/DiCr was only 2.5:1, was less stable than the gel of invention Run 29. Thus, based upon the data set forth in the above Table IV, it is concluded that lignosulfonates are effective stabilizers for, and impart increased thermal stability to, gelled solutions of cellulose ethers, e.g. CMC.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. In a method wherein a fluid medium is introduced into a borehole in the earth and into contact with a subterranean formation penetrated by said borehole, the improvement wherein at least a portion of said fluid medium comprises an aqueous gel, and wherein said gel comprises an aqueous brine having incorporated therein:

a water-thickening amount of a water-soluble cellulose ether;

a water-soluble compound of a polyvalent metal, wherein said compound of a polyvalent metal is a compound of chromium or manganese wherein the valence of the chromium therein is +6 and the valence of at least a portion of said chromium is reduced to +3 and wherein the valence of the manganese therein is +7 and the valence of at least a portion of said manganese is reduced to +4, in an amount which is sufficient to cause gelation of said aqueous brine containing said cellulose ether when the valence of at least a portion of said metal is reduced to said lower valence state;

a water-soluble reducing agent in an amount which is effective to reduce at least a portion of said metal to said lower valence state and cause said gelation with the formation of said gel wherein said reducing agent is selected from the group consisting of sodium or potassium sulfite, sodium or potassium hydrosulfite, sodium or potassium metabisulfite, sodium or potassium bisulfite, sodium or potassium sulfide, sodium or potassium thiosulfate, hydrogen sulfide, thioacetamide, hydroquinone, p-hydrazinobenzoic acid, hydrazine phosphite, hydrazine dichloride, and mixtures thereof; and a water-soluble lignosulfonate capable of, and in an amount sufficient for, increasing the stability of said gel to decomposition, with said amount being sufficient to provide a weight ratio of the amount of said lignosulfonate to the amount of said polyvalent metal compound which is effective to cause said lignosulfonate to be effective in increasing the stability of said gel wherein said weight ratio of the amount of said lignosulfonate to the amount of said polyvalent metal compound is within the range of from about 3.5:1 to about 8.5:1.

2. A method according to claim 1 wherein said aqueous gel comprises a said brine having incorporated therein:

an amount of said cellulose ether within the range of from 0.0025 to 10 weight percent, based upon the weight of said brine;

an amount of said polyvalent metal compound within the range of from 0.05 to 30 weight percent, based upon the weight of said cellulose ether; and an amount of said reducing agent within the range of from 0.1 to at least about 200 percent of the stoichiometric amount required to reduce said polyvalent metal to said lower polyvalent valence state.

3. A method according to claim 1 wherein
said cellulose ether is a carboxymethyl cellulose ether; and
said lignosulfonate is selected from the group consisting of the alkali metal lignosulfonates, the alkaline earth metal lignosulfonates, ammonium lignosulfonate, and mixtures thereof.

4. A method according to claim 2 wherein
said cellulose ether is a carboxymethyl cellulose ether; and said lignosulfonate is selected from the group consisting of the alkali metal lignosulfonates, the alkaline earth metal lignosulfonates, ammonium lignosulfonate, and mixtures thereof.

5. A method according to claim 4 wherein said polyvalent metal compound is selected from the group consisting of ammonium chromate, ammonium dichromate, the alkali metal chromates and dichromates, chromium trioxide, and mixtures thereof; and said lignosulfonate is a calcium lignosulfonate.

6. A method according to claim 2 wherein said cellulose ether is sodium carboxymethyl cellulose;

said polyvalent metal compound is sodium dichromate; and said reducing agent is sodium hydrosulfite.

7. A method according to claim 5 wherein said brine has a total dissolved solids content of at least about 22,000 parts per million parts by weight and the concentration of divalent metal cations in said brine is not more than about 5,000 parts per million parts by weight;

said cellulose ether is sodium carboxymethyl cellulose, and the amount thereof is within the range of from 0.025 to 1 weight percent;

said polyvalent metal compound is either sodium dichromate or potassium dichromate, or a mixture thereof, and the amount thereof is within the range of from 0.5 to 20 weight percent;

said reducing agent is selected from the group consisting of sodium or potassium sulfite, sodium or potassium hydrosulfite, sodium or potassium metabisulfite, sodium or potassium thiosulfate, and mixtures thereof.

8. An aqueous gel, suitable for use as at least a portion of a fluid medium in a process wherein a said fluid medium is introduced into a borehole in the earth and into contact with a subterranean formation penetrated by said borehole, said gel comprising an aqueous brine having incorporated therein:

a water-thickening amount of a water-soluble cellulose ether;

a water-soluble compound of a polyvalent metal, wherein said compound of a polyvalent metal is a compound of chromium or manganese wherein the valence of the chromium therein is +6 and the valence of at least a portion of said chromium is reduced to +3 and wherein the valence of the manganese therein is +7 and the valence of at least a portion of said manganese is reduced to +4 valence state, in an amount which is sufficient to cause gelation of said aqueous brine containing said cellulose ether when the valence of at least a portion of said metal is reduced to said lower valence state;

a water-soluble reducing agent in an amount which is effective to reduce at least a portion of said metal to said lower valence state and cause said gelation with the formation of said gel wherein said reducing agent is selected from the group consisting of sodium or potassium sulfite, sodium or potassium hydrosulfite, sodium or potassium metabisulfite, sodium or potassium bisulfite, sodium or potassium sulfide, sodium or potassium thiosulfate, hydrogen sulfide, thioacetamide, hydroquinone, p-hydrazinobenzoic acid, hydrazine phosphite, hydrazine dichloride, and mixtures thereof; and a water-soluble lignosulfonate capable of, and in an amount sufficient for, increasing the stability of said gel to decomposition, with said amount being sufficient to provide a weight ratio of the amount of said lignosulfonate to the amount of said polyvalent metal compound which is effective to cause said lignosulfonate to be effective in increasing the stability of said gel wherein said weight ratio of the amount of said lignosulfonate to the amount of said polyvalent metal compound is within the range of from about 3.5:1 to about 8.5:1.

9. An aqueous gel according to claim 8 wherein said aqueous gel comprises a said brine having incorporated therein:

an amount of said cellulose ether within the range of from 0.0025 to 10 weight percent, based upon the weight of said brine;

an amount of said polyvalent metal compound within the range of from 0.05 to 30 weight percent, based upon the weight of said cellulose ether; and an amount of said reducing agent within the range of from 0.1 to at least about 200 percent of the stoichiometric amount required to reduce said polyvalent metal to said lower polyvalent valence state.

10. An aqueous gel according to claim 8 wherein said cellulose ether is a carboxymethyl cellulose ether; and said lignosulfonate is selected from the group consisting of the alkali metal lignosulfonates, the alkaline earth metal lignosulfonates, ammonium lignosulfonate, and mixtures thereof.

11. An aqueous gel according to claim 9 wherein said cellulose ether is a carboxymethyl cellulose ether; and said lignosulfonate is selected from the group consisting of the alkali metal lignosulfonates, the alkaline earth metal lignosulfonates, ammonium lignosulfonate, and mixtures thereof.

12. An aqueous gel according to claim 11 wherein:

said polyvalent metal compound is selected from the group consisting of ammonium chromate, ammonium dichromate, the alkali metal chromates and dichromates, chromium trioxide, and mixtures thereof; and said lignosulfonate is a calcium lignosulfonate.

13. An aqueous gel according to claim 9 wherein:

said cellulose ether is sodium carboxymethyl cellulose;

said polyvalent metal compound is sodium dichromate; and said reducing agent is sodium hydrosulfite.

14. An aqueous gel according to claim 12 wherein:

said brine has a total dissolved solids content of at least about 22,000 parts per million parts by weight and the concentration of divalent metal cations in said brine is not more than about 5,000 parts per million parts by weight;

said cellulose ether is sodium carboxymethyl cellulose, and the amount thereof is within the range of from 0.025 to 1 weight percent;

said polyvalent metal compound is either sodium dichromate or potassium dichromate, or a mixture thereof, and the amount thereof is within the range of from 0.5 to 20 weight percent;

said reducing agent is selected from the group consisting of sodium or potassium sulfite, sodium or potassium hydrosulfite, sodium or potassium metabisulfite, sodium or potassium thiosulfate, and mixtures thereof.

* * * * *